United States Patent [19]

Oishi

[11] Patent Number: 5,761,015
[45] Date of Patent: Jun. 2, 1998

[54] MAGNETIC DISK CARTRIDGE HAVING A SHUTTER MEMBER PROVIDED WITH A SLIT AT A CORNER PORTION

[75] Inventor: Kengo Oishi, Kanagawa-ken, Japan

[73] Assignees: Fuji Photo Film Co., Ltd., Tokyo, Japan; Iomega Corporation, Roy, Utah

[21] Appl. No.: 704,133

[22] Filed: Aug. 28, 1996

[51] Int. Cl.⁶ .................................................. G11B 23/03
[52] U.S. Cl. .................................................. 360/133; 369/271
[58] Field of Search .................. 360/97.01, 98.01, 360/133; 369/271

[56] References Cited

U.S. PATENT DOCUMENTS

| | | | |
|---|---|---|---|
| 5,021,913 | 6/1991 | Overland et al. | 360/133 |
| 5,189,586 | 2/1993 | Rumpza et al. | 360/133 |
| 5,204,794 | 4/1993 | Yoshida | 360/133 |
| 5,226,035 | 7/1993 | Kato et al. | 369/291 |
| 5,233,494 | 8/1993 | Kikuchi | 369/291 |
| 5,382,755 | 1/1995 | Correnti | 174/67 |
| 5,537,281 | 7/1996 | Ma et al. | 360/133 |
| 5,570,252 | 10/1996 | Sumner et al. | 360/133 |

*Primary Examiner*—Jefferson Evans
*Attorney, Agent, or Firm*—Sughrue, Mion, Zinn, Macpeak & Seas, PLLC

[57] ABSTRACT

A magnetic disk cartridge has a magnetic head access opening formed in one side surface of a flat cassette shell having a top surface, a bottom surface and side surfaces. A shutter member provided to be slidable on the cassette shell for opening and closing the magnetic head access opening is constituted as a sectionally u-shaped member formed by an upper wing, a shutter section having a window and a lower wing that are interconnected and extend respectively along the top surface, one side surface and the bottom surface. The shutter member is provided on at least one of the upper and lower wings with inwardly projecting guide claws, the top or bottom surface of the cassette shell is formed with a guide groove adapted for insertion of the guide claws and extending in the sliding direction of the shutter member, and the shutter member is formed at a corner portion connecting the shutter section with the upper or the lower wing and in the vicinity of the guide claw with a slit for increasing springiness during spreading deformation of the upper or lower wing. The structure enables the shutter member to be mounted on the cassette shell without scratching the shell surface with the claws and, as such, eliminates the possibility of shavings produced by scratching getting inside the cassette shell.

3 Claims, 2 Drawing Sheets

MAGNETIC DISK CARTRIDGE HAVING A SHUTTER MEMBER PROVIDED WITH A SLIT AT A CORNER PORTION

BACKGROUND OF THE INVENTION

1. Field of the Invention

The present invention relates to a magnetic disk cartridge and, more particularly, to an improved structure of a shutter for opening and closing a magnetic head access opening in a magnetic disk cartridge having a rotatable magnetic disk encased in a cassette shell.

2. Description of the Related Art

A magnetic disk cartridge comprises a magnetic disk for magnetically recording analog and/or digital signals rotatably encased in a thin cassette shell. The cassette shell is formed in the shape of a flat prism (substantially a hexahedron) with a top surface slightly larger than the magnetic disk, a bottom surface having an opening through which a center core supporting the center of the magnetic disk is exposed and narrow side surfaces extending between the outer peripheral edges of the top and bottom surfaces. The magnetic disk cartridge is provided with a magnetic head access opening for insertion/withdrawal of magnetic heads used for magnetic recording and reproducing so as to enable the magnetic heads to be brought into contact with, or close to, the opposite surfaces of the magnetic disk from the exterior. The magnetic head access opening is equipped with a shutter member for preventing invasion of dust and the like when the magnetic disk cartridge is not in use.

The magnetic head access opening of the prior art magnetic disk cartridge is a slender opening of substantially rectangular shape formed in the top and bottom surfaces of the cassette shell to extend in the radial direction of the magnetic disk. The shutter member for opening/closing the magnetic head access opening is a piece of thin sheet metal of u-shaped section which extends along both the top and bottom surfaces of the cassette shell and also over the side surface between them.

However, it is not absolutely necessary for the magnetic head access opening to be formed in the top and bottom surfaces of the cassette shell to extend in the radial direction of the magnetic disk. Specifically, it can be provided at any location so long as it enables the magnetic heads to be brought in contact with, or close to, the opposite surfaces of the magnetic disk over the full radius thereof from the exterior. The opening is preferably as small as possible so as to minimize invasion of dust into the cartridge. The ability to fabricate smaller magnetic heads has afforded greater freedom in the positioning and sizing of the magnetic head access opening and has even made it possible to realize the desired small magnetic head access opening by providing the opening only in a side surface rather than in the top and/or bottom surface. This can be achieved by forming a narrow side surface of the cassette shell with a magnetic head access opening of a size enabling access to the opposite surfaces of the magnetic disk from the exterior and inserting/withdrawing thin, arm-shaped pickups having tiny magnetic heads attached at their tips through this hole to conduct recording and reproduction while moving the pickups in the radial direction of the magnetic disk.

Such a magnetic disk cartridge having the magnetic head access opening formed in one side surface can accommodate a high-density, high-capacity magnetic disk. Such a magnetic disk requires a high data transfer rate. Like the conventional hard disk, therefore, it is adapted to conduct recording and reproducing while being rotated at a high speed.

When the magnetic head access opening is formed in one side surface of the cassette shell, the side walls of the cassette shell become high, which is to say that the magnetic disk cartridge becomes thick. On the other hand, since the magnetic disk rapidly rotated inside the cassette shell is made of a flexible material, it tends to vibrate during rotation. To suppress vibration of the magnetic disk, the space inside the cassette shell is therefore formed to have a relatively small height (generally equal to the sum of the thickness of the magnetic disk, the thickness of liners in contact with the disk and some amount of clearance proportional to the disk rotating speed) so as to support the magnetic disk over the whole of both side surfaces. Owing to these considerations, the cassette shell is made to have a large wall thickness and exhibits little deformation when exposed to external forces.

To prevent the shutter member from falling off the side surface of the cassette shell, guide claws formed on the shutter member are engaged with a guide groove formed in the top or bottom surface of the cassette shell. When the shutter member is mounted on the cassette shell, its upper and lower wings are sprung apart until the guide claws can clear the thickness of the cassette shell and is then pushed onto the cassette shell from the side to bring the guide claws into engagement with the guide groove.

If permanent deformation should occur in the shutter member when it is spread for mounting on the cassette shell, gaps will arise between the cassette shell surfaces and shutter member mounted thereon. Since this degrades the dust proofing performance of the shutter member, various techniques are used in conventional thin magnetic disk cartridges for reducing the amount of spread required for shutter member mounting. These include tapering the claw insertion portion of the cassette shell, providing the cassette shell with a thin-wall portion to increase the flexibility of the cassette shell, and other structural arrangements for preventing concentration of excessive stress at the portions where the upper and lower wings of the shutter member connect with the shutter section thereof.

In the case of a thick-walled magnetic disk cartridge, however, it is not advisable to reduce the thickness of the cassette shell at the portion where the guide claws are inserted. This is because the need to maintain the outer dimensions of the cassette shell makes it necessary to achieve the thinning by increasing the height of the space inside the cassette shell and doing this produces a gap at the seam between the cassette shell halves and thus degrades dust proofing performance.

If the amount of shutter member spread at the time of mounting is small, moreover, the tips of the guide claws may contact and scratch the surface of the cassette shell. When this happens, the powder (shavings) produced by the scratching is likely to find its way inside the cassette shell through the magnetic head access opening, stick to the magnetic disk, and then transfer and stick to the magnetic heads and/or to damage the magnetic heads by colliding with them at high speed. This causes dropout and other problems that degrade the recording and reproducing performance.

SUMMARY OF THE INVENTION

The object of this invention is to overcome the aforesaid problems by providing a magnetic disk cartridge wherein permanent deformation is not produced in the shutter member at the time of mounting it on the cassette shell and the shutter member can be readily mounted without scratching the cassette shell.

For achieving this object, the present invention provides a magnetic disk cartridge comprising a cassette shell formed as a flat prism with a top surface slightly larger than a magnetic disk encased in the cassette shell, a bottom surface of approximately the same shape as, and parallel to, the top surface, and narrow side surfaces extending between outer peripheral edges of the top and bottom surfaces, a magnetic head access opening formed in one side surface of the cassette shell for enabling magnetic reproducing and recording heads to be brought in contact with, or close to, opposite surfaces of the magnetic disk from the exterior, a shutter member constituted as a sectionally u-shaped sheet member formed of an upper wing, a shutter section and a lower wing that are interconnected and extend respectively along said top, one side and bottom surfaces, wherein the shutter member is provided on at least one of the upper wing and the lower wing with at least one inwardly projecting guide claw, the top or bottom surface of the cassette shell is formed with a guide groove adapted for insertion of the guide claw and extending in the sliding direction of the shutter member, and the shutter member is formed at a corner portion connecting the shutter section with the upper wing or the lower wing and in the vicinity of the guide claw with a slit for increasing springiness during spreading deformation of the upper or lower wing.

A guide claw of prescribed width can be cut and raised from the upper or lower wing to leave an opening therein and the slit be formed contiguous to the opening to a length greater than the width of the guide claw.

DESCRIPTION OF THE PREFERRED EMBODIMENTS

Figure 1:
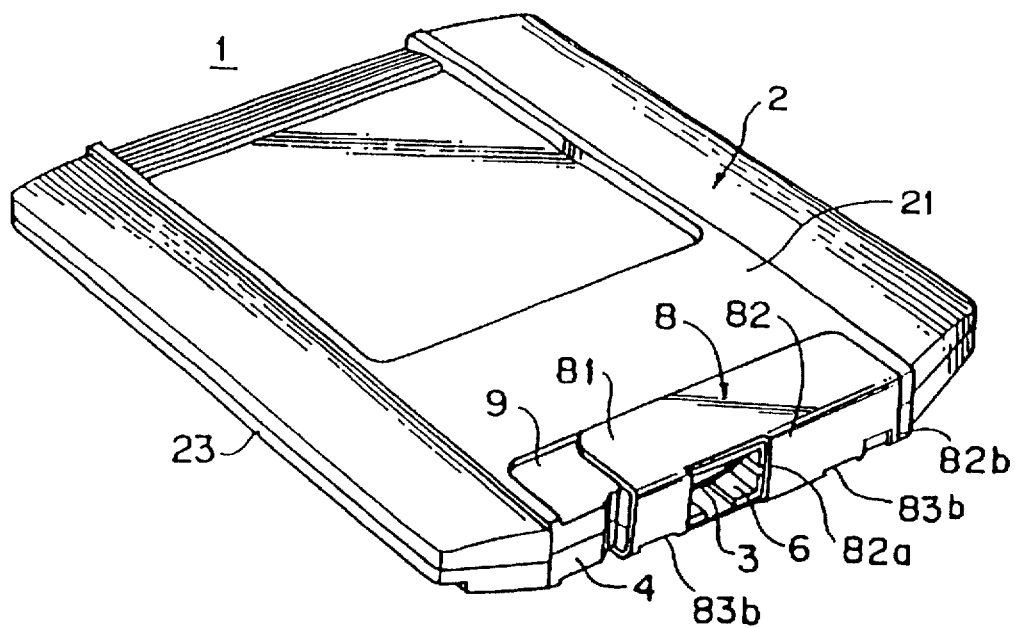
FIG. 1 is a top perspective view of a magnetic disk cartridge which is an embodiment of the invention shown with its shutter member open.
Figure 2:
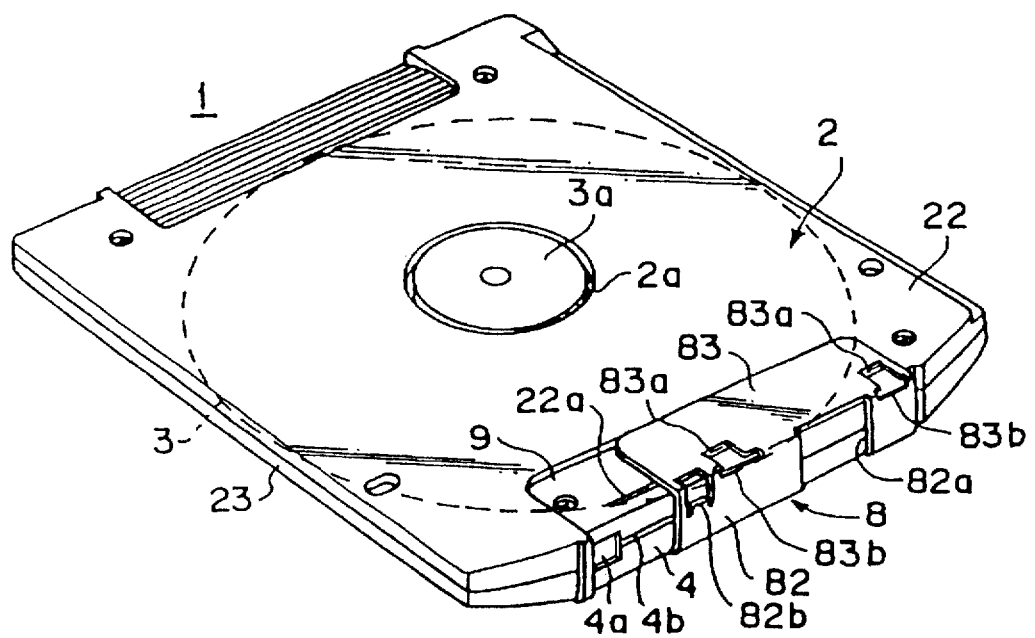
FIG. 2 is a bottom perspective view of the magnetic disk cartridge of FIG. 1 shown with its shutter member closed.
Figure 3:
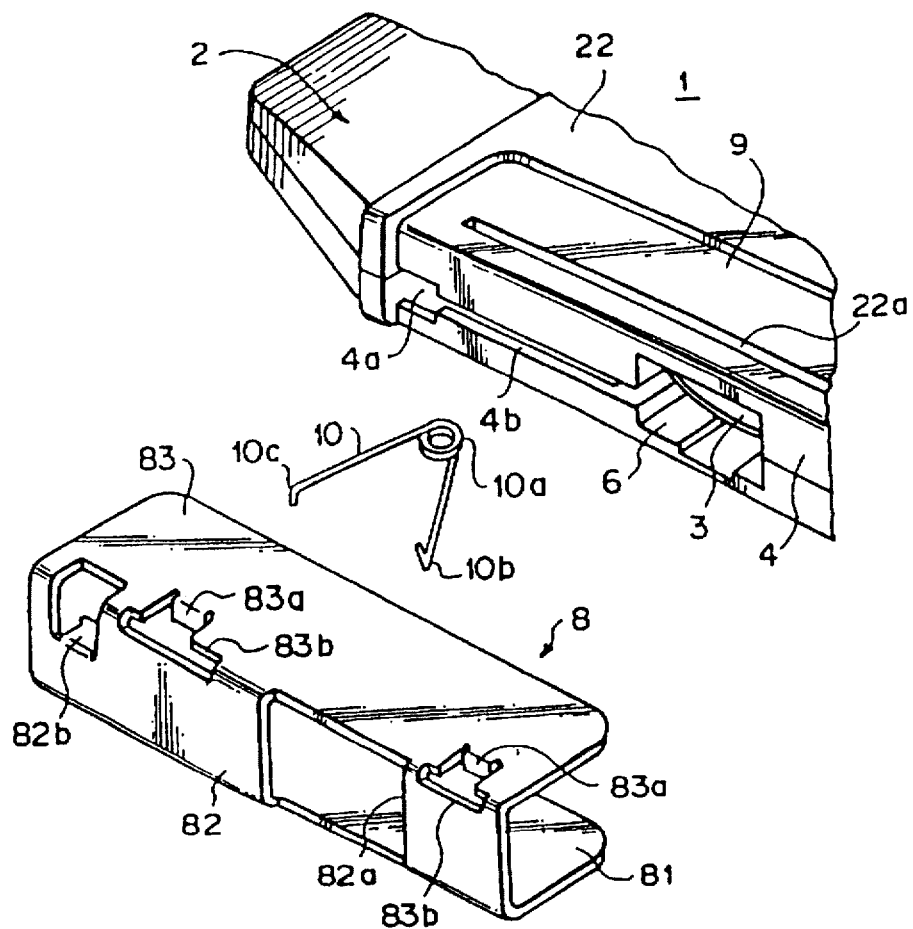
FIG. 3 is an exploded bottom perspective view of the shutter portion of the magnetic disk cartridge of FIG. 1.

The magnetic disk cartridge of the present invention will hereinbelow be described with reference to the accompanying drawings. FIGS. 1 to 3 show a magnetic disk cartridge which is a first embodiment of the invention. The magnetic disk cartridge is shown in perspective view from the top with its shutter member open in FIG. 1 and from the bottom with its shutter member closed in FIG. 2. FIG. 3 is an exploded perspective view of an essential portion of the magnetic disk cartridge.

The magnetic disk cartridge 1 of this embodiment comprises a cassette shell 2 encasing a magnetic disk 3 so as to be freely rotatable therein. The cassette shell 2 is formed of a pair of top and bottom cassette shell halves made of molded plastic. The cassette shell 2 is formed substantially as a flat hexahedron having an approximately square top surface 21 slightly larger than a magnetic disk 3 encased therein, a bottom surface 22 of substantially the same shape as the top surface 21 and lying parallel thereto, and narrow side surfaces 23 extending between the outer peripheral edges of the top surface 21 and the bottom surface 22.

The center portion of the magnetic disk 3 (recording medium) is fixed to a rotating member 3a (center core). The rotating member 3a faces into a circular opening 2a in the bottom surface 22 of the cassette shell 2 (see FIG. 2). The rotating member 3a is adapted to be engaged by a spindle for rapidly rotating the magnetic disk 3.

A magnetic head access opening 6 enabling magnetic recording and reproducing heads to be brought in contact with, or close to, the opposite surfaces of the magnetic disk 3 from the exterior is formed in one side surface 4 among the four side surfaces 23 of the cassette shell 2.

A slidable shutter member 8 for opening and closing the magnetic head access opening 6 is provided on the cassette shell 2. The shutter member 8 is constituted as a sectionally u-shaped metal sheet member comprising, as interconnected, an upper wing 81 extending along the top surface 21, a shutter section 82 extending along the one side surface 4 and a lower wing 83 extending along the bottom surface 22. The shutter member 8 moves along these surfaces. The shutter section 82 is further provided with a shutter window 82a. It can therefore open and close the magnetic head access opening 6 depending on whether the magnetic disk cartridge 1 is in storage or operation.

On the other hand, portions of the top surface 21, the side surface 4 and the bottom surface 22 of the cassette shell 2 adjacent to the magnetic head access opening 6 are formed with a shallow recess 9 for retaining and guiding the upper wing 81, the shutter section 82 and the lower wing 83 of the shutter member 8. The upper wing 81, shutter section 82 and lower wing 83 of the shutter member 8 are received in and guided by the recess 9 to be slidable laterally along the surfaces of the cassette shell 2.

As shown in FIG. 3, the shutter member 8 is constantly biased in the direction of closing the magnetic head access opening 6 by a shutter closing spring 10. The shutter closing spring 10 is constituted as a torsion spring having a base portion 10a which is inserted into the cassette shell interior through a spring insertion opening 4a formed at one end portion of the side surface 4 of the cassette shell 2, a first end portion 10b which engages with a spring engaging portion 82b provided at a lateral end portion of the shutter section 82 of the shutter member 8, and a second end portion 10 c which engages with the inner surface of the cassette shell.

The spring engaging portion 82b of the shutter member 8 is formed by cutting and bending inward a portion of the shutter section 82 so as to stand upright from the inner surface of the shutter section 82. The side surface 4 of the cassette shell 2 is formed approximately at its center portion with the magnetic head access opening 6 and at one side portion with the spring insertion opening 4a for insertion of the shutter closing spring 10. A slit-like slide groove 4b is formed in the side surface 4 to extend from the spring insertion opening 4a to the magnetic head access opening 6 in parallel with the top surface 21, i.e., in parallel with the sliding direction of the shutter member 8. The spring engaging portion 82b of the shutter member 8 passes through the slide groove 4b, as does the first end portion 10b of the shutter closing spring 10 engaged with the spring engaging portion 82b.

The lower wing 83 of the shutter member 8 is formed on opposite sides of and apart from the shutter window 82a with two inwardly projecting guide claws 83a, 83a that are aligned in the sliding direction of the shutter member 8, while the bottom surface 22 of the cassette shell 2 is formed with a guide groove 22a extending in the sliding direction of the shutter member 8. The guide claws 83a, 83a engage with the guide groove 22a to retain the shutter member 8 on the cassette shell 2. In addition, the corner portion connecting the lower wing 83 and the shutter section 82 is cut away at sections thereof near the guide claws 83a, 83a to form slits 83b, 83b. The slits 83b, 83b increase the springiness of the lower wing 83 when it is deformed by spreading. The slits 83b, 83b are formed contiguous to the openings left by the cutting and raising of the guide claws 83a, 83a.

The shutter member 8 is fabricated by bending a sheet member punched from sheet material (sheet metal). The slits 83b,83b are formed on the bending lines of the flat sheet member before bending so as to be located at the corner connecting the lower wing 83 and the shutter section 82 after bending.

Figure 4:
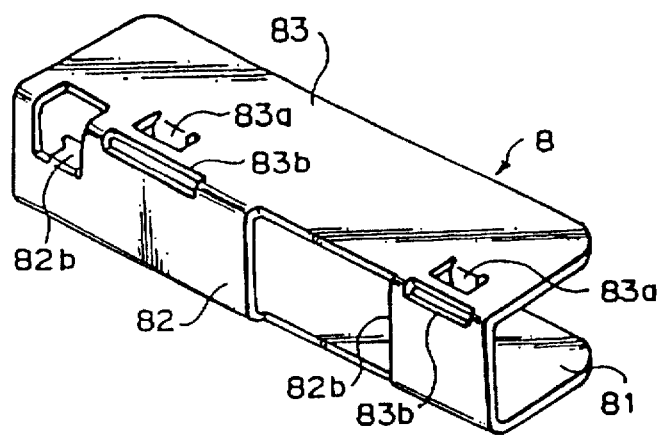
FIG. 4 is a perspective view of a shutter member used in another embodiment of the invention.

FIG. 4 shows a shutter member used in a second embodiment of the invention. While in the first embodiment the slits 83b, 83b are formed contiguous to the openings left by the cutting and raising of the guide claws 83a, 83a, in the second embodiment the slits 83b, 83b and the openings left by forming the guide claws 83a, 83a are at separate locations. In other aspects the second embodiment is identical with the first and the corresponding structural elements thereof are assigned the same reference symbols as those of the first embodiment.

In either embodiment, the lengths of the slits 83b, 83b in the sliding direction can be determined in light of the conditions involved, including the thickness and spring constant of the sheet metal constituting the shutter member 8 and the height of the guide claws 83a, 83a. Their length can be determined in light of these conditions with consideration to the fact that the force required to spread the upper and lower wings 81, 83 decreases with increasing length of the slits 83b, 83b. The lengths of the two slits 83b, 83b need not be the same and the number of slits is not limited to two.

The width of the slits 83b, 83b in the direction perpendicular to the sliding direction can be reduced to the minimum capable of enhancing springiness and is determined with consideration to the ease with which the punching of the sheet metal can be accomplished from the technical aspect.

The magnetic disk cartridge 1 of these embodiments is used in the same manner as the prior-art magnetic disk cartridge. Specifically, it is loaded into the magnetic recording and reproducing device (hereinafter called simply "device") in the state shown in FIG. 2, i.e., with the magnetic head access opening 6 closed by the shutter member 8. At this time, an operating member provided in the device responds to the loading operation by sliding the shutter member 8 to the open position shown in FIG. 1. Then, when the operator performs a prescribed operation for removing the magnetic disk cartridge 1 from the device, for instance, when the operator presses a prescribed operating button of the device, the shutter member 8 is closed to the position shown in FIG. 1.

The mounting of the shutter member 8 on the cassette shell 2 from the separated state of FIG. 3 is conducted by spreading apart the lower wing 83 and the upper wing 81 of the shutter member 8, pushing the shutter member 8 toward the cassette shell 2 so that the upper wing 81 moves along the top surface 21 and the tips of the guide claws 83a, 83a stay clear of the bottom surface 22, and bringing the guide claws 83a, 83a into engagement with the guide groove 22a. At this time, the shutter member 8 can be brought to the mounting position without contact of the tips of the guide claws 83a, 83a with the surface of the cassette shell 2 even if the shutter member 8 is formed of relatively thick and stiff sheet metal because the formation of the slits 83b, 83b increases the springiness of the lower wing 83 with respect to bending in the spreading direction and ensures that the lower wing 83 will deform flexibly at least at the slit 83b, 83b portions. As a result, damage to the magnetic heads by powder produced by scratching of the cassette shell 2 does not occur and signal dropout and the like are prevented, while smooth sliding of the shutter member 8 in the opening and closing directions is ensured.

Since various types of device side mechanisms are available for conducting the opening and closing operations of the shutter member 8 and such a mechanism can easily be constituted as in conventional devices, a detailed explanation of such a mechanism will not be given here.

The guide claws 83a, 83a can be provided on the upper wing 81 instead of the lower wing 83 of the shutter member 8 and the guide groove 22a can be provided on the top surface 21 of the cassette shell 2. It is also possible to provide guide claws on both the upper wing 81 and the lower wing 83.

Since the invention provides the magnetic head access opening of the magnetic disk cartridge in one side surface of the cassette shell, the magnetic head access opening can be made small to minimize invasion of dust and the like into the interior of the cartridge. In addition, the shutter member for opening and closing the magnetic head access opening, which is constituted as a sectionally u-shaped sheet member formed by interconnecting an upper wing, a shutter section and a lower wing that extend respectively along the top, one side and bottom surfaces of the cassette shell, is provided with guide claws which engage with a guide groove of the cassette shell and portions near the guide claws are formed with slits which increase springiness during deformation for spreading the guide claws. The upper and lower wings of the shutter member can therefore be spread apart with minimal force and without causing permanent deformation, thereby enabling the guide claws to clear the surface of the cassette shell and engage with the guide groove in the top or bottom surface thereof. The mounting performance of the shutter member is therefore excellent.

Moreover, since the mounted shutter member is free of permanent deformation, it provides the cassette shell with excellent sealing performance, prevents the formation of gaps which might degrade dust proofing performance and is safe from becoming detached. In addition, the shutter member can be mounted on the cassette shell without bringing the guide claws into strong contact with the cassette shell surface. As a result, problems do not arise owing to powder produced by scratching of the cassette shell surface, and damage to the magnetic heads, signal dropout and the like are prevented.

What is claimed is:

1. A magnetic disk cartridge comprising:
   a magnetic disk,
   a cassette shell encasing the magnetic disk to be rotatable therein and formed as a flat prism with a top surface slightly larger than the magnetic disk, a bottom surface of substantially the same shape as the top surface and lying parallel thereto and narrow side surfaces extending between outer peripheral edges of the top and bottom surfaces,
   a magnetic head access opening formed in one side surface for enabling magnetic recording and reproducing heads to be brought in contact with, or close to, opposite surfaces of the magnetic disk from the exterior, and
   a shutter member constituted as a sectionally u-shaped sheet member formed by interconnecting an upper wing, a shutter section with a shutter window and a lower wing that extend respectively along said top, one side and bottom surfaces, wherein the shutter member is provided on at least one of the upper wing and the lower wing with at least one inwardly projecting guide claw, the top or bottom surface of the cassette shell is formed with a guide groove adapted for insertion of the guide claw and extending in a sliding direction of the shutter member, and the shutter member is formed at a corner portion connecting the shutter section with the upper wing or the lower wing and in the vicinity of the guide claw with a slit for increasing springiness during spreading deformation of the upper or lower wing.

2. The magnetic disk cartridge as defined in claim 1, wherein the guide claw of prescribed width is cut and raised from the upper or lower wing to leave an opening therein and the slit is formed contiguous to the opening to a length greater than the width of the guide claw.

3. The magnetic disk cartridge as defined in claim 1, wherein said slit extends at least in the sliding direction along the corner portion of the shutter member.

* * * * *